US012525177B2

(12) United States Patent
Hwang et al.

(10) Patent No.: US 12,525,177 B2
(45) Date of Patent: Jan. 13, 2026

(54) PIXEL DRIVING CIRCUIT AND DISPLAY APPARATUS

(71) Applicant: SAPIEN SEMICONDUCTORS INC., Gyeonggi-do (KR)

(72) Inventors: Sung Ho Hwang, Gyeonggi-do (KR); Jin Woong Jang, Gyeonggi-do (KR); Hye Min Bae, Gyeonggi-do (KR); Dae Young Jung, Gyeonggi-do (KR); Vie Tan Vo, Gyeonggi-do (KR)

(73) Assignee: SAPIEN SEMICONDUCTORS INC., Gyeonggi-do (KR)

( * ) Notice: Subject to any disclaimer, the term of this patent is extended or adjusted under 35 U.S.C. 154(b) by 0 days.

(21) Appl. No.: 18/893,876

(22) Filed: Sep. 23, 2024

(65) Prior Publication Data

US 2025/0140174 A1 May 1, 2025

(51) Int. Cl.

| | |
|---|---|
| ***G09G 5/10*** | (2006.01) |
| ***G09G 3/20*** | (2006.01) |
| ***G09G 3/32*** | (2016.01) |

(52) U.S. Cl.
CPC ............. *G09G 3/32* (2013.01); *G09G 3/2096* (2013.01); *G09G 2310/08* (2013.01); *G09G 2330/021* (2013.01)

(58) Field of Classification Search
CPC .... G09G 3/32; G09G 3/2096; G09G 2310/08; G09G 2330/021
USPC .......................................................... 345/691
See application file for complete search history.

(56) References Cited

U.S. PATENT DOCUMENTS

| | | | | |
|---|---|---|---|---|
| 2003/0178946 A1* | 9/2003 | Nakamura | ........... | G09G 3/3233 315/169.3 |
| 2005/0225683 A1* | 10/2005 | Nozawa | ............... | G09G 3/3258 348/801 |
| 2010/0066714 A1* | 3/2010 | Ozaki | .................. | G09G 3/2081 345/207 |
| 2016/0267837 A1* | 9/2016 | Wang | ................... | G09G 3/3216 |
| 2021/0312856 A1* | 10/2021 | Jeong | ....................... | G09G 3/32 |
| 2024/0282244 A1* | 8/2024 | Kim | ..................... | G09G 3/3275 |

* cited by examiner

*Primary Examiner* — Jennifer T Nguyen
(74) *Attorney, Agent, or Firm* — Eschweiler & Potashnik, LLC; Harris Kim

(57) ABSTRACT

Provided is a pixel driving circuit connected to a light-emitting element, the pixel driving circuit including a first memory storing a bit value of bit data associated with image data of a single frame including a plurality of subframes, a controller configured to generate a pulse width modulation (PWM) signal and a control signal for controlling light emission or non-light emission of the light-emitting element, based on data stored in the first memory, a driving unit configured to supply power to the light-emitting element based on the PWM signal and the control signal, received from the controller, and a bias circuit configured to supply bias power to the driving unit based on the control signal received from the controller.

12 Claims, 13 Drawing Sheets

| Cap data | # of Refresh |
|---|---|
| 000 | All times |
| 001 | 1 times |
| 010 | 2 times |
| 011 | 3 times |
| 100 | 4 times |
| 101 | 5 times |
| 110 | 6 times |
| 111 | 7 times |

Not applied
Applied for 1-bit
Applied for 2-bit
Applied for 3-bit
Applied for 4-bit
Applied for 5-bit
Applied for 6-bit
Applied for 7-bit
Applied for 8-bit
1110
1111
1120
1
2
3
4
5
6
7
8
END

PIXEL DRIVING CIRCUIT AND DISPLAY APPARATUS

CROSS-REFERENCE TO RELATED APPLICATION

This application is based on and claims priority under 35 U.S.C. § 119 to Korean Patent Application No. 10-2023-0149111, filed on Nov. 1, 2023, in the Korean Intellectual Property Office, the disclosure of which is incorporated by reference herein in its entirety.

TECHNICAL FILED

The present disclosure relates to pixel driving circuits included in a display apparatus, and more particularly, to pixel driving circuits, which reduce a static power consumption, and a display apparatus including the same.

BACKGROUND

A typical display apparatus includes a plurality of pixels including M*N pixels arranged therein. Each pixel may include one or more light-emitting elements, and generally includes three light-emitting elements R, G, and B. Each light-emitting element is called a subpixel.

Various methods for controlling driving of subpixels include a pulse width modulation (PWM) control method that stores image data to control emission of a subframe in a single frame in built-in memory and controls gradation through a PWM signal. The pixel driving circuit for driving each pixel for PWM control may be implemented with a transistor, but may be divided into a digital circuit and an analog circuit depending on an operating region of the transistor.

The digital circuit may operate in a cutoff region and a non-saturation region corresponding to 'ON' and 'OFF' to express '0' and '1'. On the other hand, the analog circuit (excluding an analog switch) such as an amplifier (AMP) or a bias operates in a saturation region, continuing to consume a certain amount of current during an operation time of the circuit. As the same power may not be required at all times depending on a display driving mode or screen, a method for reducing static power consumption in the pixel driving circuit is required.

The above-mentioned background technology is technical information that the inventor possessed for deriving the present disclosure or acquired in the process of deriving the present disclosure, and may not be necessarily said to be known art disclosed to the general public before filing the application of the present disclosure.

BRIEF SUMMARY

The present disclosure aims to provide a pixel driving circuit and a display apparatus. The problem that the present disclosure aims to solve is not limited to the problems mentioned above, and other problems and advantages of the present disclosure that are not mentioned can be understood through the following description and can be understood more clearly by the examples of the present disclosure. In addition, it will be appreciated that the problems and advantages to be solved by the present disclosure may be realized by means and combinations thereof indicated in the claims.

Additional aspects will be set forth in part in the description which follows and, in part, will be apparent from the description, or may be learned by practice of the presented embodiments of the present disclosure.

According to a first aspect of the present disclosure, a pixel driving circuit connected to a light-emitting element includes a first memory storing a bit value of bit data associated with image data of a single frame including a plurality of subframes, a controller configured to generate a pulse width modulation (PWM) signal and a control signal for controlling light emission or non-light emission of the light-emitting element, based on data stored in the first memory, a driving unit configured to supply power to the light-emitting element based on the PWM signal and the control signal, received from the controller, and a bias circuit configured to supply a bias power to the driving unit based on the control signal received from the controller, in which the controller is further configured to control the bias circuit to perform a first operation of supplying the bias power to the driving unit and stopping supplying the bias power when the capacitor included in the driving unit is charged with the bias power and control the bias circuit not to perform the first operation in a partial section of the single frame.

According to a second aspect of the present disclosure, a display apparatus includes a display panel including an array of a plurality of pixel driving circuits, each of which is connected to a light-emitting element and which form rows and columns, a scan driving circuit configured to sequentially output row signals to pixel driving circuits arranged in a row direction in the array included in the display panel, a data driving circuit configured to output column signals associated with driving of light-emitting elements respectively corresponding to the plurality of pixel driving circuits to pixel driving circuits arranged in a column direction in the array included in the display panel, and a timing controller configured to generate signals for controlling operations of the scan driving circuit and the data driving circuit, in which each of the plurality of pixel driving circuits includes a first memory storing a bit value of bit data associated with image data of a single frame including a plurality of subframes, a controller configured to generate a pulse width modulation (PWM) signal and a control signal for controlling light emission or non-light emission of a corresponding light-emitting element, based on data stored in the first memory, a driving unit configured to supply power to the corresponding light-emitting element based on the PWM signal and the control signal, received from the controller, and a bias circuit configured to supply a bias power to the driving unit based on the control signal received from the controller, and in which the controller is further configured to control the bias circuit to perform a first operation of supplying the bias power to the driving unit and stopping supplying the bias power when the capacitor included in the driving unit is charged with the bias power and control the bias circuit not to perform the first operation in a partial section of the single frame, and the timing controller is further configured to generate a bit value of bit data associated with the partial section in which the first operation is not performed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
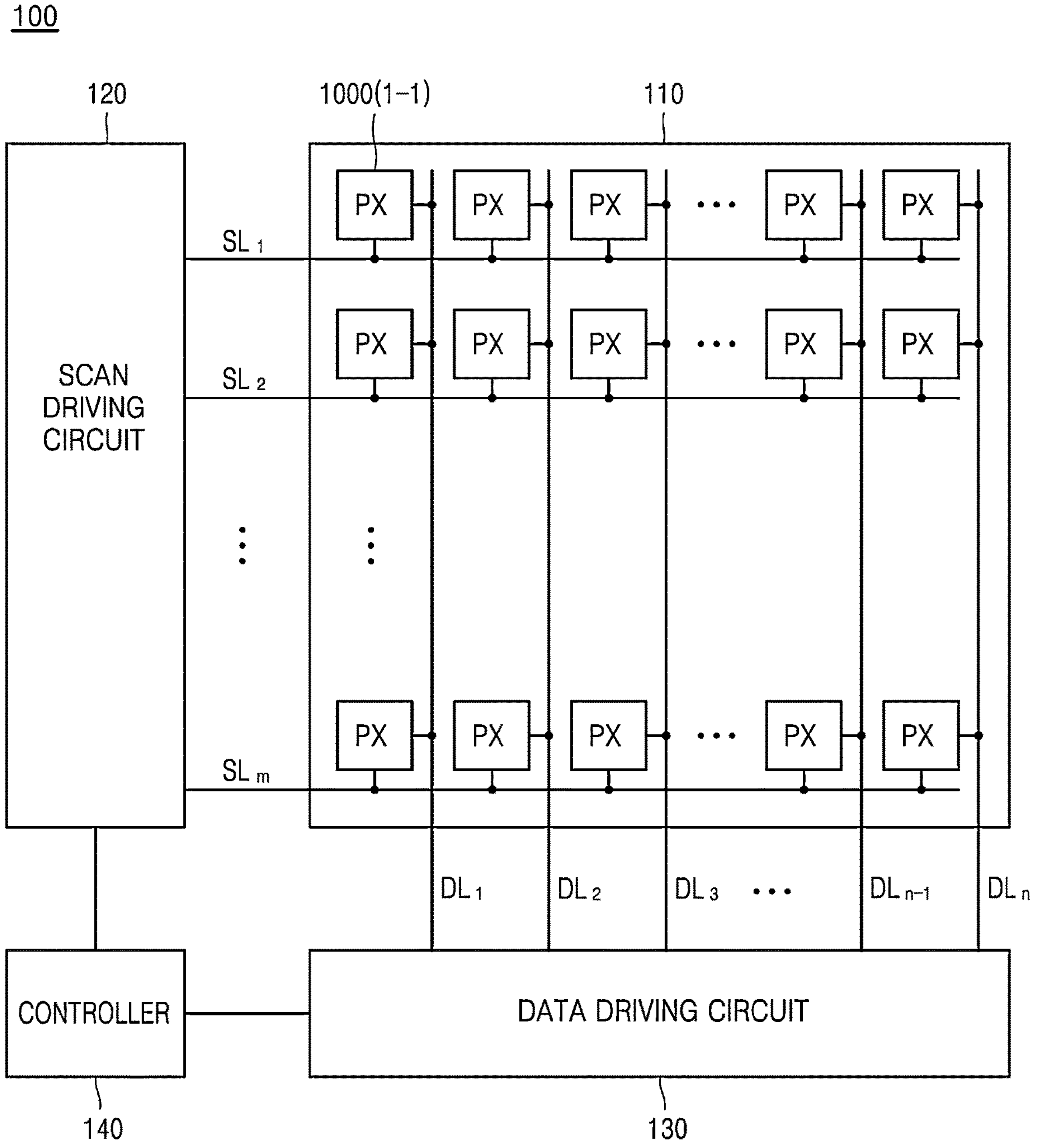
FIG. 1 shows a display apparatus including a plurality of pixel driving circuits, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure, and a method of achieving them will be apparent with reference to the embodiments described in detail in conjunction with the drawings. However, the present disclosure is not limited to the embodiments presented below, but may be implemented in various different forms, and should be understood to include all transformations, equivalents, and substitutes included in the spirit and technical scope of the present disclosure. Embodiments presented below are provided to complete the present disclosure of the present disclosure and perfectly inform those of ordinary skill in the art of the category of the present disclosure. In describing the present disclosure, if it is determined that a detailed description of related known technologies may obscure the gist of the present disclosure, the detailed description thereof will be omitted.

The terms used in the embodiments are general terms that are currently widely used as much as possible, but may vary depending on the intention or precedent of a person working in the art, the emergence of new technology, etc. In addition, in a specific case, the applicant voluntarily may select terms, and in this case, the meaning of the terms may be disclosed in a corresponding description part of the present disclosure. Thus, the terms used in herein should be defined not by the simple names of the terms but by the meaning of the terms and the contents throughout the specification.

The term used herein is used to describe particular embodiments, and is not intended to limit the present disclosure. Singular forms may include plural forms unless apparently indicated otherwise contextually. Herein, it should be understood that the term "include", "have", or the like used herein is to indicate the presence of features, numbers, steps, operations, components, parts, or a combination thereof described in the specifications, and does not preclude the presence or addition of one or more other features, numbers, steps, operations, components, parts, or a combination thereof.

In addition, terminology, such as "first" or "second" used herein, can be used to describe various components, but the components should not be limited by the terms. These terms are used to distinguish one component from another component.

In the entire specification, when a part "includes" a certain element, it means that other elements may be further included, rather than excluding other elements, unless stated otherwise. In addition, the terms " . . . unit" and " . . . module" refer to a unit that processes at least one function or operation, which may be implemented as hardware (for example, at least one processor or at least one electrical circuit) or software, or a combination of hardware and software.

In the following embodiment, "ON" used in connection with an element state may refer to an activated state of the element, and "OFF" may refer to a deactivated state of the element. "ON", as used in connection with a signal received by a device, may refer to a signal that activates the element, and "OFF" may refer to a signal that deactivates the element. The element may be activated by high or low voltage. For example, a P-type transistor may be activated by low voltage. An N-type transistor may be activated by high voltage. Accordingly, it should be understood that "ON" voltages for a P-type transistor and an N-type transistor have opposite (low vs. high) voltage levels.

When one element is referred to as being "connected to" another element, it includes both direct connection to the other element or intervening another element therebetween. Hereinafter, embodiments of the present disclosure will be described in detail with reference to the accompanying drawings.

FIG. 1 shows a display apparatus including a plurality of pixel driving circuits, according to an embodiment of the present disclosure.

Referring to FIG. 1, a display apparatus 100 according to an embodiment of the present disclosure may include a display panel 110, a scan driving circuit 120, a data driving circuit 130, and a controller 140. The controller 140 may be referred to as a timing controller or an external controller for distinguishment from a controller 213 inside the pixel driving circuit 200, which will be described later.

For example, each of the controller 140 and the controller 213 may be implemented as at least one processor or at least one electrical circuit. The processor may be implemented as an array of a plurality of logic gates, or may be implemented as a combination of a general-purpose microprocessor and a memory storing a program executable by the microprocessor. For example, the processor may include a general-purpose processor, a central processing unit (CPU), a microprocessor, a digital signal processor (DSP), a controller, a microcontroller, a state machine, etc. In some environments, the processor may include an application-specific integrated circuit (ASIC), a programmable logic device (PLD), a field-programmable gate array (FPGA), etc. For example, a processor may refer to a combination of processing devices, such as a combination of a DSP and a microprocessor, a combination of a plurality of microprocessors, a combination of one or more microprocessors combined with a DSP core, or a combination of any other such configurations.

In the present disclosure, the display panel 110 may include a plurality of pixels PX. In an embodiment, the plurality of pixels PX may include M*N pixels (M and N are natural numbers) arranged in the form of a matrix, but the plurality of pixels PX may be arranged in various patterns, such as a zigzag pattern, etc., according to different embodiments.

In the present disclosure, the display panel 110 may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), and an electro luminescent display (ELD), a vacuum fluorescent display (VFD), and as a flat panel display or flexible display of other types. In the present disclosure, the display panel 110 will be described as being implemented as an LED display as an example.

In the present disclosure, each of the plurality of pixels PX may include one or more light-emitting elements. In an embodiment, the light-emitting element may be an LED. The LED may be a micro LED with a size of 100 μm or less. In an embodiment, one pixel PX may output various colors through a plurality of light-emitting elements having different colors. As an example, one pixel PX may include light-emitting elements of red, green, and blue. As another example, one pixel PX may further include a white light-emitting element which may replace any one of the red, green, and blue light-emitting elements. As another example, one pixel PX may include one white light-emitting element. In an embodiment in which one pixel PX includes a plurality of light-emitting elements, each light-emitting element included in one pixel PX may be referred to as a 'subpixel'.

In the present disclosure, each pixel PX may include a pixel driving circuit that drives a light-emitting element included in the pixel, that is, a subpixel. In the present disclosure, the pixel driving circuit may drive a turn-on or turn-off operation of a subpixel by a signal output from the scan driving circuit 120 and/or the data driving circuit 130. In an embodiment, the pixel driving circuit may include at least one transistor, at least one capacitor, etc. In an embodiment, the pixel driving circuit may be implemented by a stacked structure on a semiconductor wafer.

In the present disclosure, the display panel 110 may include one or more scan lines $SL_1$ to $SL_m$ arranged in a row direction and one or more data lines $DL_1$ to $DL_n$ arranged in a column direction. In the present disclosure, each pixel PX may be located at an intersection point between the one or more scan lines $SL_1$ to $SL_m$ and the one or more data lines $DL_1$ to $DL_n$. Each pixel PX may be connected to any one scan line $SL_k$ and any one data line $DL_k$. The one or more scan lines $SL_1$ to $SL_m$ may be connected to the scan driving circuit 120, and the one or more data lines $DL_1$ to $DL_n$ may be connected to the data driving circuit 130.

In the present disclosure, the scan driving circuit 120 may output a signal (hereinafter, referred to as a row signal) that causes one or more pixels connected to any one of the one or more scan lines $SL_1$ to $SL_m$ to be driven. Preferably, the scan driving circuit 120 may sequentially select the one or more scan lines $SL_1$ to $SL_m$. For example, a pixel connected to the first scan line $SL_1$ may be driven during a first scan driving period, and a pixel connected to the second scan line $SL_2$ may be driven during a second scan driving period. The operation of the scan driving circuit 120 of the present disclosure will be described in detail later.

In the present disclosure, the data driving circuit 130 may output a signal related to a gradation (hereinafter, referred to as a column signal) to each pixel through the one or more data lines $DL_1$ to $DL_n$. One data line may be connected to one or more pixels in a longitudinal direction, but the signal related to a gradation may be input to pixels connected to a scan line selected by the scan driving circuit 120. The operation of the data driving circuit 130 of the present disclosure will be described in detail later.

In the present disclosure, the controller 140 may output a control signal to execute operations of the scan driving circuit 120 and the data driving circuit 130. The controller 140 may output a control signal corresponding to image data corresponding to one image frame to the scan driving circuit 120 or the data driving circuit 130. According to an embodiment of the present disclosure, the controller 140 may be a timing controller.

Figure 2:
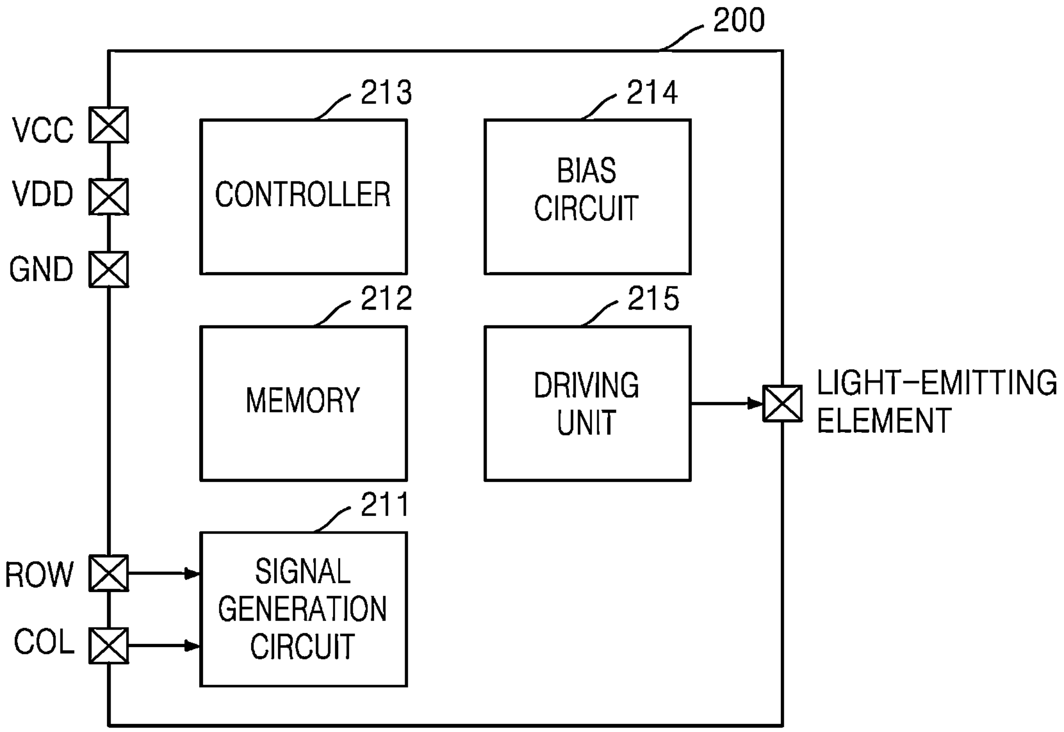
FIG. 2 is a block diagram schematically showing a pixel driving circuit according to an embodiment of the present disclosure.

FIG. 2 is a block diagram schematically showing a pixel driving circuit according to an embodiment of the present disclosure.

Referring to FIG. 2, the pixel driving circuit 200 of the present disclosure may include a signal generation circuit 211, a memory 212, the controller 213, a bias circuit 214, and a driving unit 215. In addition, the pixel driving circuit 200 may include terminals VCC and GND for receiving power, a terminal for outputting a light-emission control signal to a light-emitting element, a terminal ROW for receiving the row signal output from the scan driving circuit 120, and a terminal COL for receiving the column signal output from the data driving circuit 130. It would be easily understood by those of ordinary skill in the art that electrical connections may be configured to input and output power and signals through terminals included in the pixel driving circuit 200 and to input and output power and signals between components included in the pixel driving circuit 200.

In an embodiment, the signal generation circuit 211 may generate a signal for operating each element of the pixel driving circuit 200, based on a signal applied to the pixel driving circuit 200. The row signal and the column signal, applied to the pixel driving circuit 200, may be input to the signal generation circuit 211.

In an embodiment, the signal generation circuit 211 may generate a clock signal. As will be described later, the clock signal may be generated corresponding to each of a plurality of subframes constituting one frame.

In an embodiment, the memory 212 may be configured to store data related to control of a pixel or a light-emitting element of the present disclosure. In an embodiment, the memory 212 may include a first memory and a second memory. The first memory may store video data comprising a plurality of image data, and the second memory may store charging control data. In the present disclosure, the charging control data may mean control data representing a bit value that controls the number of charging/discharging times of the capacitor. The video data may refer to data about a set of gradations at which a light-emitting element emits light during one frame or one PWM cycle. The charging control data may refer to data associated with the number of charging times of the capacitor within one frame. Each of the image data and the charging control data may be multi-bit data. The first memory and the second memory will be described in detail later.

In an embodiment, the controller 213 may generate a control signal based on data stored in the memory and a signal transmitted from the signal generation circuit 211.

In an embodiment, the control signal may include a driving control signal and a bias control signal. In an embodiment, the driving control signal may be PWM signals.

In an embodiment, as will be described later, the driving control signal may be a basis for the driving unit 215 to supply power to the light-emitting element.

In an embodiment, as will be described later, the bias control signal may be a basis for the bias circuit 214 to supply a bias power to the driving unit.

In an embodiment, the controller 213 may control charging and discharging states of the capacitor included in the driving unit 215. In an embodiment, the controller 213 may control whether to charge the capacitor based on the charging control data stored in the charging control memory. The operation of the capacitor of the present disclosure will be described in detail later.

In the present disclosure, the charging control data may be input to the pixel driving circuit 200 (e.g., the signal generation circuit 211) from outside the pixel driving circuit 200. The charging control data input to the pixel driving circuit 200 may be stored in the memory 212 (specifically, the second memory 312 to be described later). In an embodiment, the charging control data may be generated by the controller 140 of FIG. 1. In another embodiment, the charging control data may be generated by the scan driving circuit 120 or the data driving circuit 130 of FIG. 1. In addition to the above-described embodiments, the charging control data may be generated by any suitable circuit, e.g., an additional component not shown in FIG. 1, and input to the pixel driving circuit 200. In an embodiment, the charging control data may be input to the pixel driving circuit through a scan line or a data line.

In an embodiment, the driving unit 215 may control power supply to a light-emitting element based on data stored in the memory 212 or a driving control signal generated based on data stored in the memory 212. In an embodiment, the driving unit 215 may be configured to control power supply to the light-emitting element according to a PWM driving method that is known to those of ordinary skill in the art and thus will not be described in detail.

In an embodiment, the bias circuit 214 may supply a bias power to the driving unit 215. To supply the bias power, the bias circuit 221 may be connected to the terminal VCC for receiving power. The operation of the bias circuit 221 of the present disclosure will be described in detail later.

Figure 3:
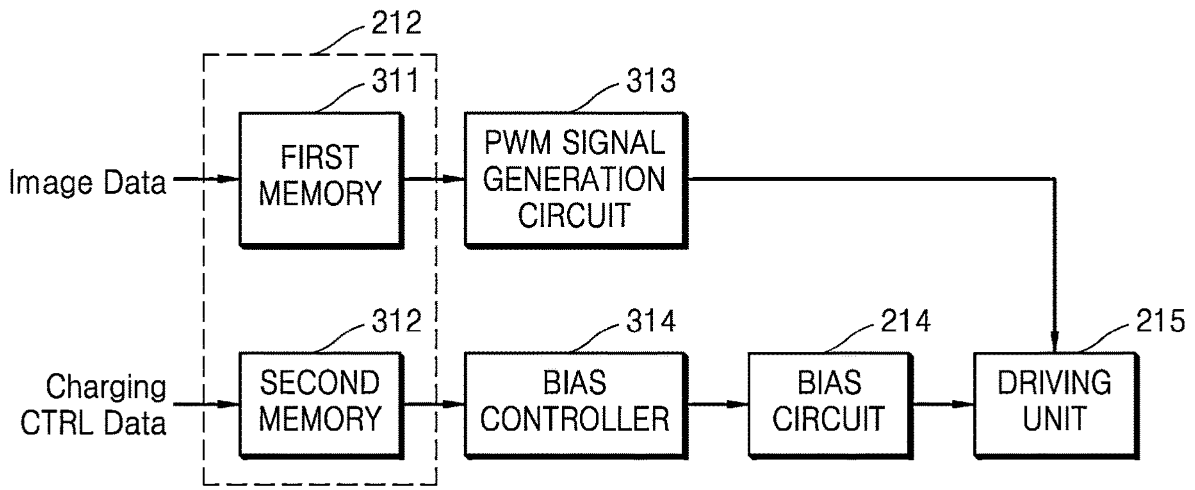
FIG. 3 is a block diagram for roughly describing the flow of signals in a pixel driving circuit, according to an embodiment of the present disclosure.

FIG. 3 is a block diagram for roughly describing the flow of signals in a pixel driving circuit, according to an embodiment of the present disclosure.

As described above, the memory 212 may include a first memory 311 and a second memory 312.

In an embodiment, the first memory 311 may store video data. Specifically, in an embodiment, the first memory 311 may store bit values of bit data associated with the image data. In an embodiment, the image data for an LED may correspond to one frame.

In an embodiment, one frame may include as many subframes as the number of digits of bit-values of image data. When a display apparatus displays n-bit image data for an LED, one frame may include n subframes, n being a positive integer. In an embodiment, the length of each subframe may be different. For example, the length of the subframe corresponding to the most significant bit (MSB) may be set to be the longest, the lengths of the subframes corresponding to the middle bits gradually decrease, and the length of the subframe corresponding to the least significant bit (LSB) may be set to be the shortest. The order of the MSB to the LSB of the image data may correspond to the order of the first subframe to the $n^{th}$ subframe. The order of expression of subframes may be set differently by a display controller chip designer.

In an embodiment, clock signals may be generated corresponding to a plurality of subframes. In an embodiment, the length of each of the clock signals may be equal to the length of the corresponding subframe. In an embodiment, the clock signals may be generated according to a set order of subframes.

In an embodiment, the pixel driving circuit 200 may include a PWM signal generation circuit 313 that may generate a PWM signal based on data stored in the first memory 311. In a specific embodiment, the PWM signal generation circuit 313 may generate a PWM signal based on the data stored in the first memory 311 and the row signal. The PWM signal generated by the PWM signal generation circuit 313 may be input to the driving unit 215.

In an embodiment, the second memory 312 may store the charging control data. In the present disclosure, the charging control data may refer to data associated with the number of charging times of the capacitor within one frame. Thus, the second memory 312 may store bit values of bit data associated with the number of charging times of the capacitor within one frame. Here, the capacitor may refer to a capacitor included in the driving unit 215.

In an embodiment, the pixel driving circuit 200 may include a bias controller 314. The bias controller 314 may be understood as being included in the controller 213 described above. The bias controller 314 may generate a bias control signal based on data stored in the second memory 312, and the operation of the bias circuit 214 may be controlled by the bias control signal.

As described above, the bias circuit 214 may supply a bias power to the driving unit 215.

Embodiments related to the data stored in the second memory 312 of the present disclosure, that is, the charging control data, will be described in detail later.

Figure 4:
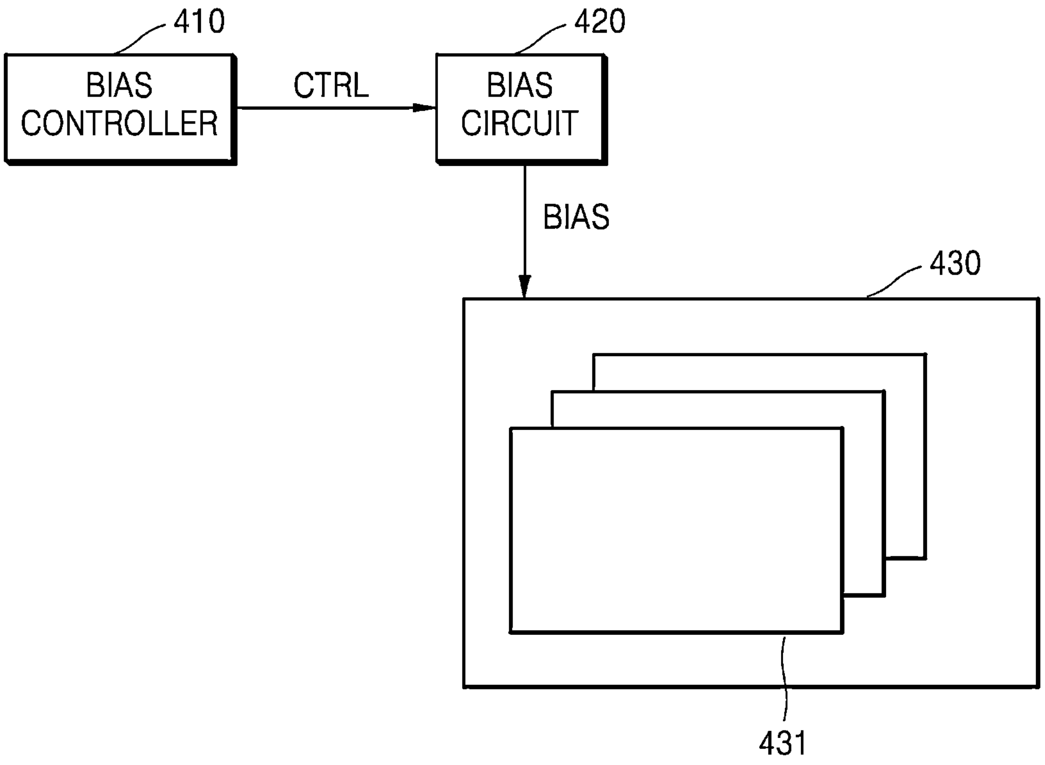
FIG. 4 is a diagram for roughly describing the concept of a sub-driving unit according to an embodiment of the present disclosure.

FIG. 4 is a diagram for roughly describing the concept of a sub-driving unit according to an embodiment of the present disclosure.

Referring to FIG. 4, a driving unit 430 including a bias controller 410, a bias circuit 420, and one or more sub-driving units 431 is shown. In FIG. 4, the bias controller 410 may be a component corresponding to the controller 213 of FIG. 2 or the bias controller 314 of FIG. 3, and the bias circuit 420 may be a component corresponding to the bias circuit 214 of FIGS. 2 and 3, and the driving unit 430 may be a component corresponding to the driving unit 215 of FIGS. 2 and 3.

In the present disclosure, the driving unit 430 may control power supply to one or more light-emitting elements. In an embodiment, the driving unit 430 may include one or more sub-driving units 431 respectively corresponding to the one or more light-emitting elements. That is, a pixel of the present disclosure may include one or more light-emitting elements, and one sub-driving unit 431 may be configured to correspond to one light-emitting element.

As described above, the driving unit 430 may control the power supply to the one or more light-emitting elements based on data stored in the memory. Specifically, the sub-driving unit 431 may control a power supply to the light-emitting element based on the data stored in the memory. The sub-driving unit 431 may supply a power to the light-emitting element based on the image data stored in the first memory. In an embodiment, the sub-driving unit 431 may include a capacitor that charges power required to drive the light-emitting element, and the capacitor of the present disclosure will be described in detail later.

In the present disclosure, the bias circuit 420 may supply a bias power to the driving unit 430, and specifically, the bias circuit 420 may supply a bias power to the sub-driving unit 431. To supply the bias power to the sub-driving unit 431, the bias circuit 420 may be connected to the terminal VCC through which the pixel driving circuit receives power.

In an embodiment, whether to supply power to the sub-driving unit 431 by the bias circuit 420 may be controlled by a bias control signal CTRL output from the bias controller 410. In an embodiment, the bias control signal CTRL for controlling whether or not to supply a power to the sub-driving unit 431 of the bias circuit 420 may be output from the bias controller 410. In an embodiment, a function of controlling the operation of the capacitor of the bias controller 410 may be performed in a separate component from the bias controller 410, but the present disclosure is not limited thereto.

In an embodiment, the power supplied by the bias circuit 420 may be stored in the capacitor included in the sub-driving unit 431.

In an embodiment, the bias controller 410 may control whether to charge the capacitor based on the charging control data stored in the second memory. In other words, the bias controller 410 may control whether to supply a power to the bias circuit 420 and whether to charge the capacitor, by outputting the bias control signal CTRL based on the charging control data stored in the memory.

In an embodiment, when the driving unit 431 includes the one or more sub-driving units 431, the charging control data may include charging control data for each of the one or more sub-driving units 431. Accordingly, the second memory 312 may store the charging control data for each of the one or more sub-driving units 431.

Figure 5:
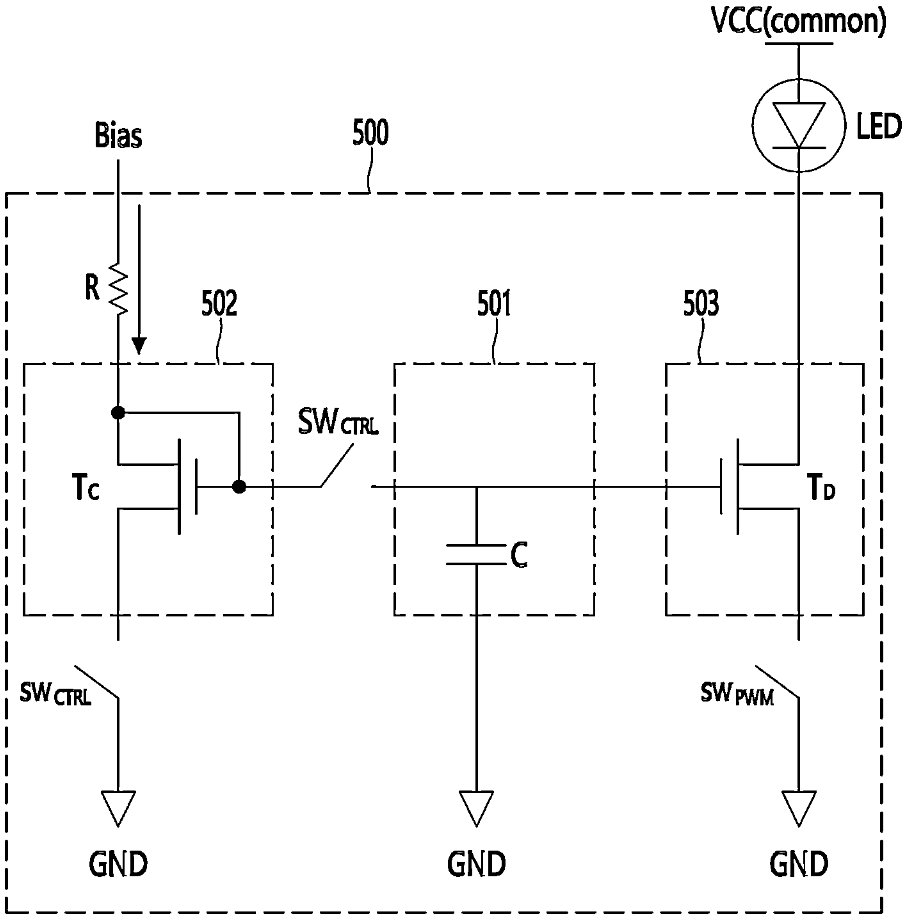
FIG. 5 is a circuit diagram for describing a structure of a driving unit, according to an embodiment of the present disclosure.

FIG. 5 is a circuit diagram for describing a structure of a driving unit, according to an embodiment of the present disclosure.

A driving unit 500 shown in FIG. 5 may be a component corresponding to the driving unit 215 of FIG. 2, and in an embodiment, when a pixel includes one or more light-emitting elements, the driving unit 500 shown in FIG. 5 may be a component corresponding to the sub-driving unit 431 of FIG. 4.

FIG. 5 is a diagram for describing an example of implementing the driving unit of the present disclosure, and those of ordinary skill in the art may implement the driving unit of the present disclosure in various specific ways by referring to FIG. 5 and the description of the present disclosure.

Referring to FIG. 5, the driving unit 500 according to an embodiment may include a capacitor 501 that stores power for driving a light-emitting element, a charger 502 that supplies power to the capacitor 501, a discharger 503 that supplies the power stored in the capacitor 501 to the light-emitting element, and switches $SW_{CTRL}$.

Referring to FIG. 5, the charger 502 may be connected between a pixel positive power source and a pixel negative power source. The discharger 503 may be connected between the pixel positive power source and the pixel negative power source. The capacitor 501 may be connected between the charger 502 and the discharger 503. A switch unit SW may be connected between the charger 502 and the capacitor 501. The switch unit SW may be turned on or off by the bias control signal CTRL output from the controller.

The charger 502 may include one or more charging transistors $T_C$. The charger 502 may supply reference current to the capacitor 501 and the discharger 503 based on the bias power received from the bias circuit 214 (or the bias circuit 420). The charger 502 may be connected between the bias circuit 214 (or the bias circuit 420) and GND.

The capacitor 501 may be charged based on the current supplied from the charger 502. One terminal of the capacitor 501 may be connected between a gate terminal of a charging transistor $T_C$ of the charger 502 and a gate terminal of a discharging transistor $T_D$ of the discharger 530. One terminal of the capacitor 501 may be connected to GND.

The discharger 503 may be connected between VCC and GND. The discharger 503 may include one or more discharging transistors $T_D$.

One of the switches $SW_{CTRL}$ may be connected between the gate terminal of the charging transistor $T_C$ of the charger 502 and the capacitor 501, and the other of the switches $SW_{CTRL}$ may be connected between the charging transistor $T_C$ and GND. The switches $SW_{CTRL}$ may be turned on or off by the control signal CTRL output from the controller.

In an embodiment, the driving unit 500 may include a PWM switching element $SW_{PWM}$. The PWM switching element $SW_{PWM}$ may be serially connected to the discharger 503. The PWM switching element $SW_{PWM}$ may be turned on or off depending on data stored in the memory. Specifically, the PWM switching element $SW_{PWM}$ may operate with a driving control signal generated based on the data stored in the first memory.

Meanwhile, when the charger 502 or the discharger 503 includes a different type of transistor (e.g., a PMOS field effect transistor (PMOSFET)), one terminal of each of one or more capacitors of the capacitor 501 may be used to receive power other than power from the pixel negative power source.

In the embodiments described with reference to FIG. 5, the "controller" may be the controller 213 and the bias controllers 314 and 410 described above.

Figure 6:
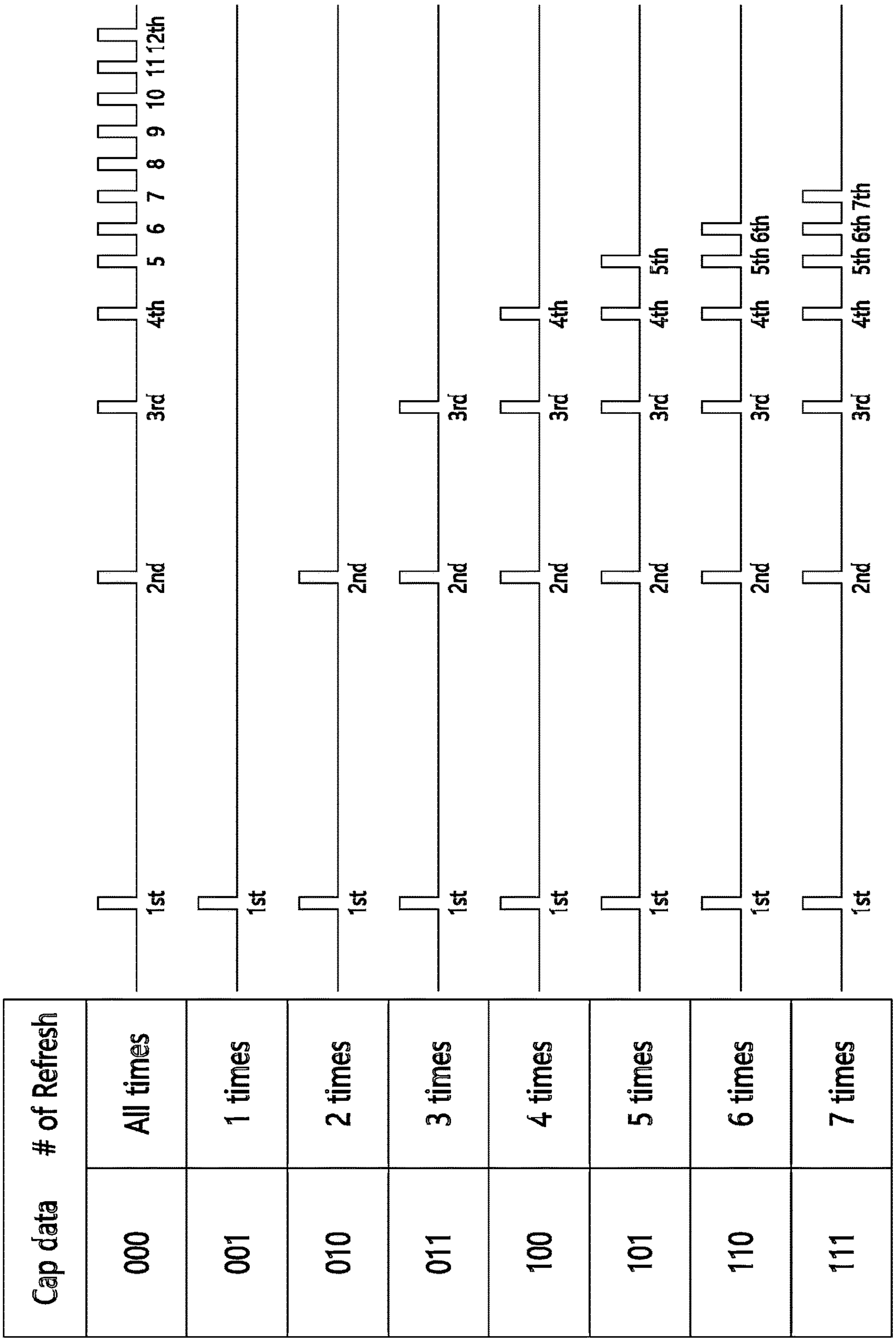
FIG. 6 is an exemplary diagram of the number of charging times of a capacitor based on charging control data, according to an embodiment of the present disclosure.

FIG. 6 is an exemplary diagram of the number of charging times of a capacitor according to charging control data according to an embodiment of the present disclosure.

Referring to FIG. 6, an example is shown where the charging control data ("Cap data") stored in the memory includes 3-bit values, and the image data includes 12-bit values from 1st to 12nd bits.

In the present disclosure, charging control data may correspond to the number of times a capacitor can be charged in one cycle (i.e., a single frame). That is, the number of charging times of the capacitor within a single frame may be defined through the charging control data.

Referring to FIG. 6, for example, when the charging control data is <000>, the controller may output a control signal such that the capacitor may be charged all 12 times within 1 cycle. When the charging control data is <001>, the controller may output a control signal such that the capacitor is charged only once within 1 cycle. When the charging control data is <010>, the controller may output a control signal such that the capacitor is charged twice within one cycle. When the charging control data is <011>, the controller may output a control signal such that the capacitor is charged three times within one cycle. That is, a value of the charging control data stored in the memory may be a value related to the number of charging times of the capacitor during 1 cycle, and the controller may output a control signal to the capacitor to control charging of the capacitor according to the charging control data stored in the memory. However, the example shown in FIG. 6 is intended to help understanding, and the number of bits of the charging control data and the number of charging times according to the charging control data may be appropriately set in any manner.

In the embodiments described with reference to FIG. 5, the "controller" may be the controller 213 and the bias controllers 314 and 410 described above.

Figures 7A, 7B, 7C, 7D:
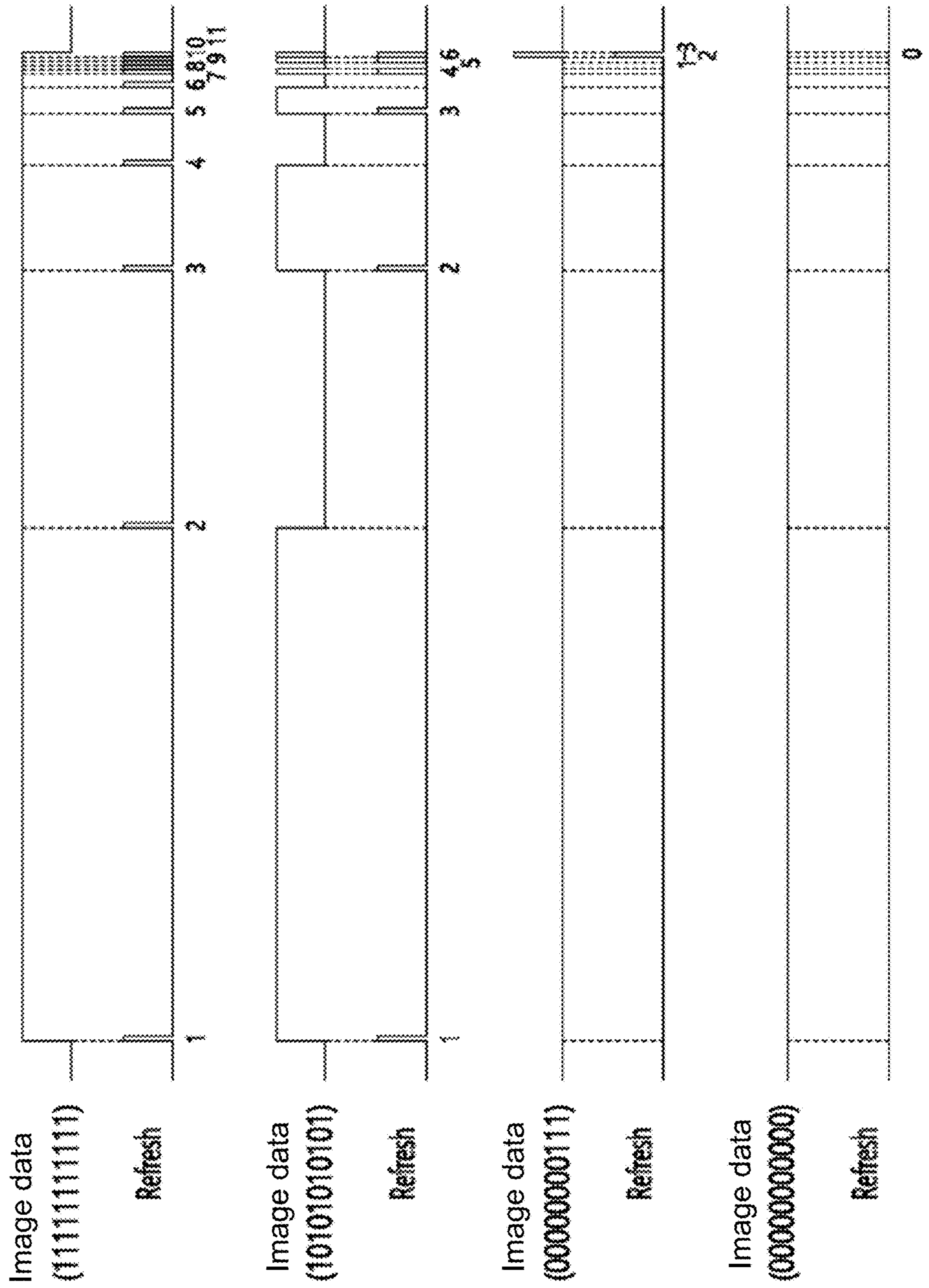
FIGS. 7A to 7D are exemplary diagrams for describing control of a power supply by a bias circuit according to embodiments of the present disclosure.

FIGS. 7A and 7D are exemplary diagrams for describing the control of a power supply by the bias circuit according to embodiments of the present disclosure.

In the present disclosure, as described above, the controller may control whether or not to supply a power by the bias circuit through a bias control signal.

In an embodiment, the controller may control the bias circuit to supply a bias power to the driving unit and to stop supplying power when the capacitor included in the driving unit is charged with the bias power supplied by the bias circuit (hereinafter, referred to as a "first operation"). According to the first operation of the present disclosure, power consumption may be reduced by limiting the operation of the bias circuit.

In one embodiment, the controller may control the bias circuit to supply a bias power (hereinafter, referred to as a "second operation") only when the bit value of the video data is 1. That is, the controller may not operate the bias circuit in response to the bit value of the video data being 0. According to the second operation of the present disclosure, bias power supply may be blocked when there is no need to charge the capacitor, thereby reducing power consumption.

In an embodiment, the controller may control the bias circuit to perform the first operation and the second operation in combination. In other words, the controller may control the bias circuit to supply a bias power (the second operation) only when the bit value of the video data is 1, and to stop a power supply (the first operation) when the capacitor included in the driving unit is charged with the bias power supplied by the bias circuit.

Referring to FIGS. 7A to 7D, timing diagrams are shown to describe various embodiments in which the controller control the bias circuit to supply the bias power only when the value of the video data is 1.

For example, referring to FIG. 7A, when the image data is (11111111111), all bit values of the image data are 1, such that the controller may operate the bias circuit in response to all bits of the image data.

Meanwhile, referring to FIG. 7*b*, when the image data of the capacitor is (10101010101), the controller may operate the bias circuit only in response to the bit value of the image data being "1". On the other hand, in response to the bit value of the image data being "0", as described above, there is no need to drive the light-emitting element, such that the capacitor is not charged. The current embodiment may implement this feature by blocking the supply of bias power required for charging the capacitor.

Referring to FIG. 7C, it is shown that even when the image data of the capacitor is (00000000111), the capacitor is not charged when each bit values of the image data being "0," which are the first 6 digit bits from MSB to MSB−5 and is charged only when each bit value is "1," which are the last 3 digit bits including LSB, LSB+1 and LSB+2.

Meanwhile, referring to FIG. 7D, when the image data of the capacitor is (00000000000), all values of the image data are 0, and the controller may not operate the bias circuit in response to all of "0" of the image data, and accordingly, the capacitor may not be charged in response to the all bits of the image data.

In the embodiments described with reference to FIGS. 7A to 7D, the "controller" may be the controller 213 and the bias controllers 314 and 410 described above.

Figure 8:
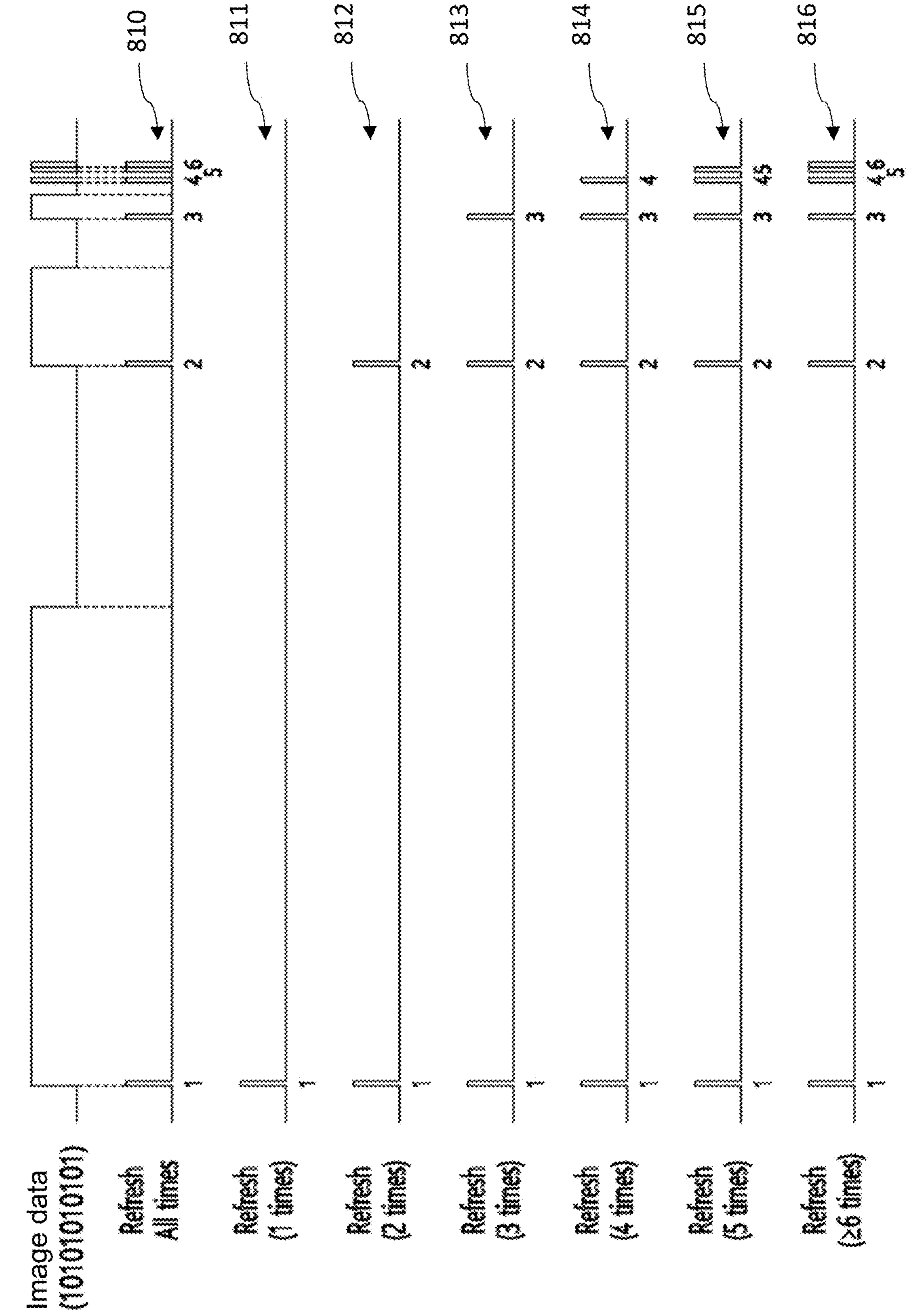
FIG. 8 is an exemplary diagram for describing control of a power supply by a bias circuit when the number of charging times is defined, according to an embodiment of the present disclosure.

FIG. 8 illustrates exemplary diagrams for describing a controlling of a power supply by a bias circuit according to embodiments of the present disclosure.

As described above with reference to FIG. 6, the number of charging times of the capacitor within a single frame may be defined through the charging control data, and as described above with reference to FIGS. 7A to 7D, the controller may operate the bias circuit only in response to the bit value of the video data being 1.

In an embodiment, when the number of charging times is defined, the controller may control the bias circuit to supply a power (the second operation) only when the bit value of the image data is "1", and to stop a power supply (the first operation) when the capacitor included in the driving unit is charged with the bias power supplied by the bias circuit, such that the bias power supply is performed only as many times as the number of charging times within a single frame. In other words, the controller may operate the bias circuit only in response to the bit value of the image data being "1", but the number of times the bias circuit is operated within a single frame may be limited. That is, when the number of bits with a value of "1" included in the image data within a single frame exceeds the number of charging times, the controller may control the bias circuit to charge the capacitor in response to as many bits as the number of charging times among the bits with a value of "1" in the video data and not to charge the capacitor in response to the others. Preferably, the controller 213 may operate the bias circuit in response to the bit value being "1" for more significant bits, and when the number of operations of the bias circuit reaches the defined number of charging times within a single frame, then the controller 213 may not operate the bias circuit for less significant bits. In the current embodiment, the controller may block bias power supply for bits exceeding the number of charging times, thereby reducing power consumption.

Referring to FIG. 8, timing diagrams are shown to describe embodiments for charging the capacitor according to various numbers of charging times when the image data is "10101010101".

Referring to FIG. 8, an example is shown in which the number of charging times is not defined or is defined (All times) such that the capacitor is charged for all bits with a bit value of 1 in the image data. As shown, the controller may control the capacitor to be charged in response to all bits with a bit value of "1" in the image data within a single frame when the number of charging times is not defined or is defined such that the capacitor is charged for all bits with a bit value of "1" in the image data within a single frame. In other words, the controller may control the bias circuit such that bias power is supplied in response to all bits of the image data with a bit value of 1 within a single frame.

Referring to FIG. 8, when the number of charging times is defined as "1", an example is shown in which the capacitor is charged for only one of the bits with a bit value of "1" in the image data within a single frame. As shown in refresh diagram 810, when the number of charging times is defined as "1", the controller may control the capacitor to be charged in response to only one of the bits with a bit value of "1" in the image data. In other words, the controller may control the bias circuit such that bias power is supplied only once within a single frame.

Likewise, referring to FIG. 8, when the number of charging times is defined as K, an example is shown in which the capacitor is charged for K bits among the bits with a bit value of "1" in the image data within a single frame. As shown, when the number of charging times is defined as K, the controller may control the capacitor to be charged in response to only K bits among the bits with a bit value of "1" in the image data. That is, in the example shown in FIG. 8, there are 6 bits with a bit value of "1" in the image data of 10101010101 within a single frame, but as the number of charging times is defined as K, the capacitor may be charged in response to only K bits out of the 6 bits, and may not be charged in response to the remaining bits except for the K bits. K is a positive integer. K may be "1" in refresh diagram 811, "2" in refresh diagram 812, "3" in refresh diagram 813, "4" in refresh diagram 814, "5" in refresh diagram 815, or >= "6" in refresh diagram 816. In other words, the controller may control the bias circuit such that bias power is supplied up to K times within a single frame.

Referring to FIG. 8, in the example shown in FIG. 8, there are 6 bits with a bit value of "1" in the image data of 10101010101 within a single frame, such that when the number of charging times is defined as a value of 6 or greater, the capacitor may be charged in response to all bits with a bit value of 1.

In the example shown in FIG. 8, when the number of charging times is defined, the capacitor may be charged by preferentially corresponding to the more significant bits among the bits with a bit value of 1 in the image data, but this is merely an example and any suitable method may be applied.

The image data shown in FIG. 8 may be provided as an example, and it would be understood by those of ordinary skill in the art that the method of the present disclosure may be applied to image data including the number of bits, bit values, and the number of bits with a bit value of "1" in any single frame.

In an embodiment, the number of charging times of the capacitor may be defined by a user.

In the embodiments described with reference to FIG. 8, the "controller" may be the controller 213 and the bias controllers 314 and 410 described above.

Figure 9A:
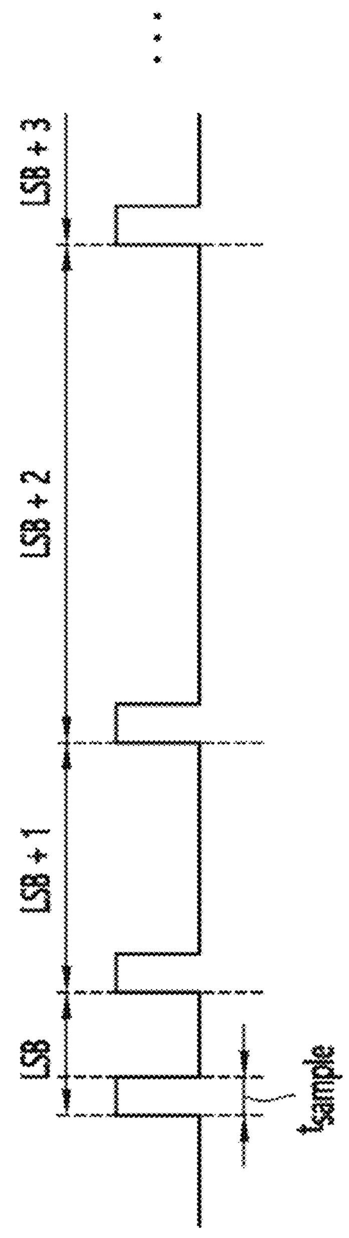
FIGS. 9A and 9B are timing diagrams for describing signal changes in a high-speed driving environment or a low-brightness driving environment.
Figure 9B:
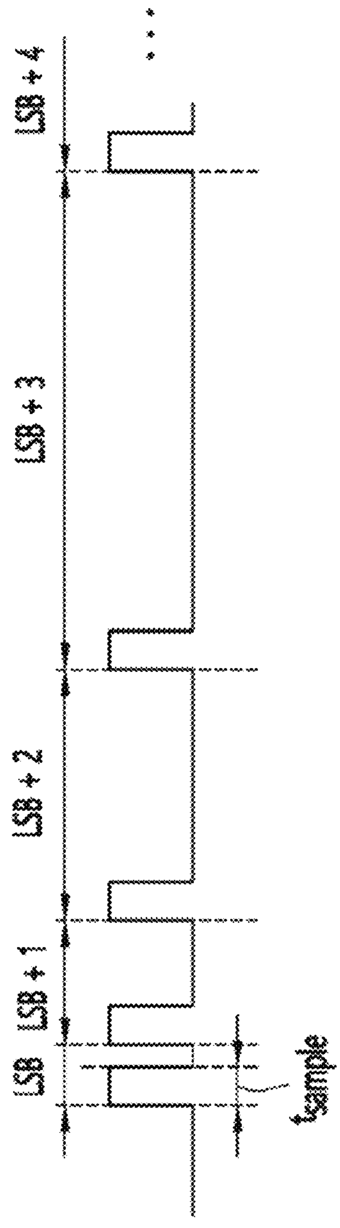

FIGS. 9A and 9B illustrate timing diagrams for describing signal changes in a high-speed driving environment or a low-brightness driving environment.

Timing diagrams shown in FIG. 9A to 9B may be timing diagrams related to the operation described above with reference to one of FIGS. 7A to 7D. Specifically, the timing diagrams may correspond to a case with image data of (111111 . . . ) in the embodiments of FIG. 7A. That is, the timing diagram shown in FIG. 9A shows that the first operation is performed in response to each subframe. For convenience of description, FIGS. 9A and 9B show examples in which subframes are expressed in the order from the LSB to the MSB.

The timing diagram in FIG. 9B may be related to an environment in which the display apparatus (or pixel) is driven at a faster frame rate than the timing diagram in FIG. 9A. When the display apparatus is driven at a faster speed, the time allocated to one frame is reduced, such the time allocated to a subframe may also be reduced, and this may be expressed as in the timing diagram in FIG. 9B. Additionally, as the brightness expression in the PWM driving method is controlled by the signal width (on duty), the case of the display apparatus that displays a low-brightness image may also be understood in the same way.

Meanwhile, in FIGS. 9A and 9B, $t_{sample}$ may mean the minimum time required to perform the first operation. That is, $t_{sample}$ may be a time required for the bias circuit to supply a bias power and then stop supplying power when the capacitor included in the driving unit is charged with the bias power supplied by the bias circuit. In another aspect, $t_{sample}$ may be a time that the bias circuit needs to maintain power supply in order to charge the capacitor included in the driving unit to a desired value. Even in a high-speed driving environment or a low-brightness driving environment, there may be a limit to the reduction of $t_{sample}$. Referring to FIGS. 9A and 9B, it may be seen that $t_{sample}$ is not reduced in the timing diagram in FIG. 9B compared to the timing diagram in FIG. 9A.

On the other hand, when the display apparatus (or pixel) is driven at a faster speed or displays an image with a lower brightness than in the timing diagram in FIG. 9B, a period corresponding to a subframe may be smaller than $t_{sample}$. In this case, the first operation may not be performed normally. In particular, this phenomenon is highly likely to occur in the less significant bits with a smaller pulse width than a threshold. For example, LSB and LSB+1 and LSB+2 are less significant bits when the threshold is a pulse width of LSB+3. In another embodiment, LSB and LSB+1 are less significant bits when the threshold is a pulse width of LSB+2.

To this end, in an embodiment of the present disclosure, a scheme to omit the first operation in a partial section may be adopted. The partial section may mean a part of the entire section when a section corresponding to one frame is the entire section.

Figure 10:
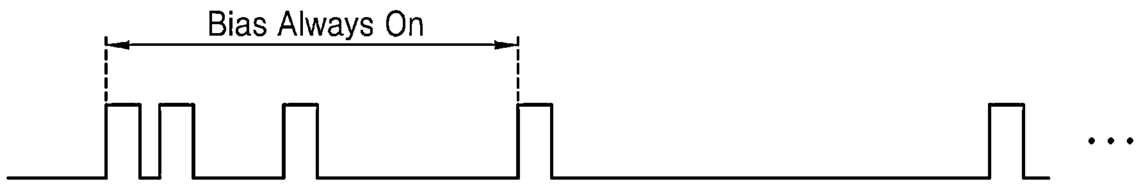
FIG. 10 is a timing diagram for describing a method of omitting a specific operation in a partial section, according to an embodiment of the present disclosure.

FIG. 10 is a timing diagram for describing a scheme to omit a specific operation in a partial section, according to an embodiment of the present disclosure.

As described above, as a time corresponding to a specific subframe in a high-speed driving environment or a low-brightness driving environment may be smaller than $t_{sample}$, performing the first operation in response to all subframes may be insufficient or lead to undesirable expression of an image.

Accordingly, in an embodiment, the first operation may be controlled not to be performed in the partial section. Specifically, the controller 213 (or the bias controller 314) may control the bias circuit to perform a first operation of supplying bias power to the driving unit and stopping supplying the bias power when the capacitor included in the driving unit is charged with the bias power and not to perform the first operation for the partial section.

In an embodiment, the partial section in which the first operation is not to be performed may correspond to less significant bits than a preset bit. In the example shown in FIG. 10, the preset bit is LSB+3, and the first operation may not be performed on the LSB, LSB+1, and LSB+2.

In an embodiment, in the partial section in which the first operation is not performed, the state of the bias circuit may be always ON instead of performing the first operation. That is, in the partial section in which the first operation is not to be performed, the controller 213 (or the bias controller 314) may control the bias circuit to continuously supply a bias power to the driving unit. In the example shown in FIG. 10, the state of the bias circuit may be always ON for the LSB, LSB+1, and LSB+2.

In another embodiment, the bias circuit may be always in an OFF state in the partial section in which the first operation is not to be performed. That is, in the partial section in which the first operation is not to be performed, the controller 213 (or the bias controller 314) may control the bias circuit not to supply a bias power.

Meanwhile, the partial section in which the first operation is not to be performed may be set through a register. The register may also be referred to as a third memory or a section setting register. In an embodiment, the pixel driving circuit 200 may further include a register that may store the section setting data. In the present disclosure, the section setting data may mean setting data representing bit values that control the partial section in which the first operation is not to be performed. Accordingly, the register may store a bit value of bit data associated with a section in which the first operation is not to be performed within one frame. For example, setting data corresponding to the above-mentioned preset bits may be stored in the register. The size of the section setting data stored in the register may be appropriately set according to the size of the image data. For example, data stored in the register may include 3 bits. Meanwhile, the register may be as part of the memory 212 or the second memory 312, or may be included in the memory 212 or the second memory 312.

In an embodiment, the controller 213 (or the bias controller 314) may generate a bias control signal based on the bit value of the data stored in the register, and the operation of the bias circuit 214 may be performed by the bias control signal.

In the present disclosure, the section setting data stored in the register may be input to the pixel driving circuit 200 (e.g., the signal generation circuit 211) from outside the pixel driving circuit 200. In an embodiment, the section setting data may be generated by the controller 140 of FIG. 1. In another embodiment, the section setting data may be generated by the scan driving circuit 120 or the data driving circuit 130 of FIG. 1. In addition to the above-described embodiments, the section setting data may be generated by any suitable circuit, e.g., an additional component not shown in FIG. 1, and input to the pixel driving circuit 200. In an embodiment, the section setting data may be input to the pixel driving circuit through a scan line or a data line.

Meanwhile, the section setting data may be determined to be an appropriate value depending on a driving speed or a driving brightness. The section setting data may be determined to be a bit value that controls a section in which the appropriate first operation is not performed so as to optimize power consumption according to the driving speed or the driving brightness.

Determination of the section setting data may be performed based on Equations 1 to 3 below.

$$P_{total} = P_A + P_B \quad \text{[Equation 1]}$$

In Equation 1, $P_{total}$ may mean a total power consumed during 1 cycle, $P_A$ may mean a power consumed in a section in which the first operation is not to be performed during 1 cycle, and $P_B$ may mean a power consumed in a section in which the first operation is to be performed within 1 cycle. Meanwhile, in the present disclosure, P, which represents the power in Equation 1, will be simplified and described as a value determined by current and time, omitting a constant voltage for convenience of description. According to an embodiment of the present disclosure, a voltage applied during 1 cycle may be, for example, a fixed constant voltage between 3 V and 5 V, and a factor that determines the consumed power P may be ultimately viewed as a consumed current, and the power may be determined by a value $I_{VCC}$ and a time in which the current flows. Therefore, hereinafter, the unit of the consumed power will be expressed as ampere (A) rather than watt (W) for convenience of description.

$$P_A = \frac{I_{VCC}}{\text{frame\_time}} \times \left\{\#cyc \times t_{dummy} + \left(\frac{1}{\text{frame\_rate}} \times \text{on\_duty} \times \frac{2^m - 1}{2^n - 1}\right)\right\} \quad \text{[Equation 2]}$$

Equation 2 may describe calculating a power consumed in a section in which the first operation is not to be performed, within 1 cycle. In Equation 2, $I_{VCC}$ may refer to VCC current, frame_time may refer to a time allocated to a single frame (1 cycle), #cyc may refer to the number of repetitions, and $t_{dummy}$ may refer to a time allocated to dummy data. Additionally, in Equation 2, frame_rate may mean a driving speed, and on_duty may mean a driving brightness as a value expressing the driving brightness. Additionally, in Equation 2, n may mean the size (the number of bits) of image data, and m may mean the number of bits in the section in which the first operation is not to be performed.

Meanwhile, Equation 2 may relate to an embodiment in which the state of the bias circuit is always ON in a partial section in which the first operation is not to be performed.

$$P_B = \frac{I_{VCC}}{\text{frame\_time}} \times \#cyc \times t_{sample} \times (n - m) \quad \text{[Equation 3]}$$

Equation 3 may describe calculating a power consumed in a section in which the first operation is to be performed, within 1 cycle. In Equation 3, $t_{sample}$ may mean the minimum time required for the first operation to be performed.

Through Equations 1 to 3 described above, m at which $P_{total}$ may be minimized at specific driving speed and brightness may be determined. Based on this, section setting data with a bit value corresponding to m may be stored in the register.

As an example, for frame_rate of 240 hz, on_duty of 40%, n of 12, a time allocated to the LSB of 200 ns, $I_{VCC}$ of 100 μA, $t_{dummy}$ of 1 us, and $t_{sample}$ of 600 ns, when the pixel driving circuit is driven for 1 cycle, a power consumption corresponding to m may be calculated as below.

TABLE 1

| m | 6 | 5 | 4 | 3 |
|---|---|---|---|---|
| $P_A$ | 331 nA | 175 nA | 97 nA | 58 nA |
| $P_B$ | 86 nA | 101 nA | 115 nA | 130 nA |
| $P_{total}$ | 417 nA | 276 nA | 212 nA | 188 nA |

Referring to Table 1, in the above-mentioned conditions, when m is 3, that is, when the first operation is not performed for the LSB, LSB+1, and LSB+2, $P_{total}$ is the smallest, and thus period setting data may be determined is set such that m is 3.

FIGS. 11A to 11I are timing diagrams for describing various periods in which the power supply operation are omitted depending on bit configurations, according to an embodiment of the present disclosure.

From the timing diagrams of FIGS. 11A to 11I, it may be understood that the partial section in which the first operation is not to be performed may be changed. In FIGS. 11A to 11I, the areas indicated by dotted lines may represent the partial sections in which the first operation is not to be performed.

Figures 11A, 11B, 11C, 11D, 11E, 11F, 11G, 11H, 11I:
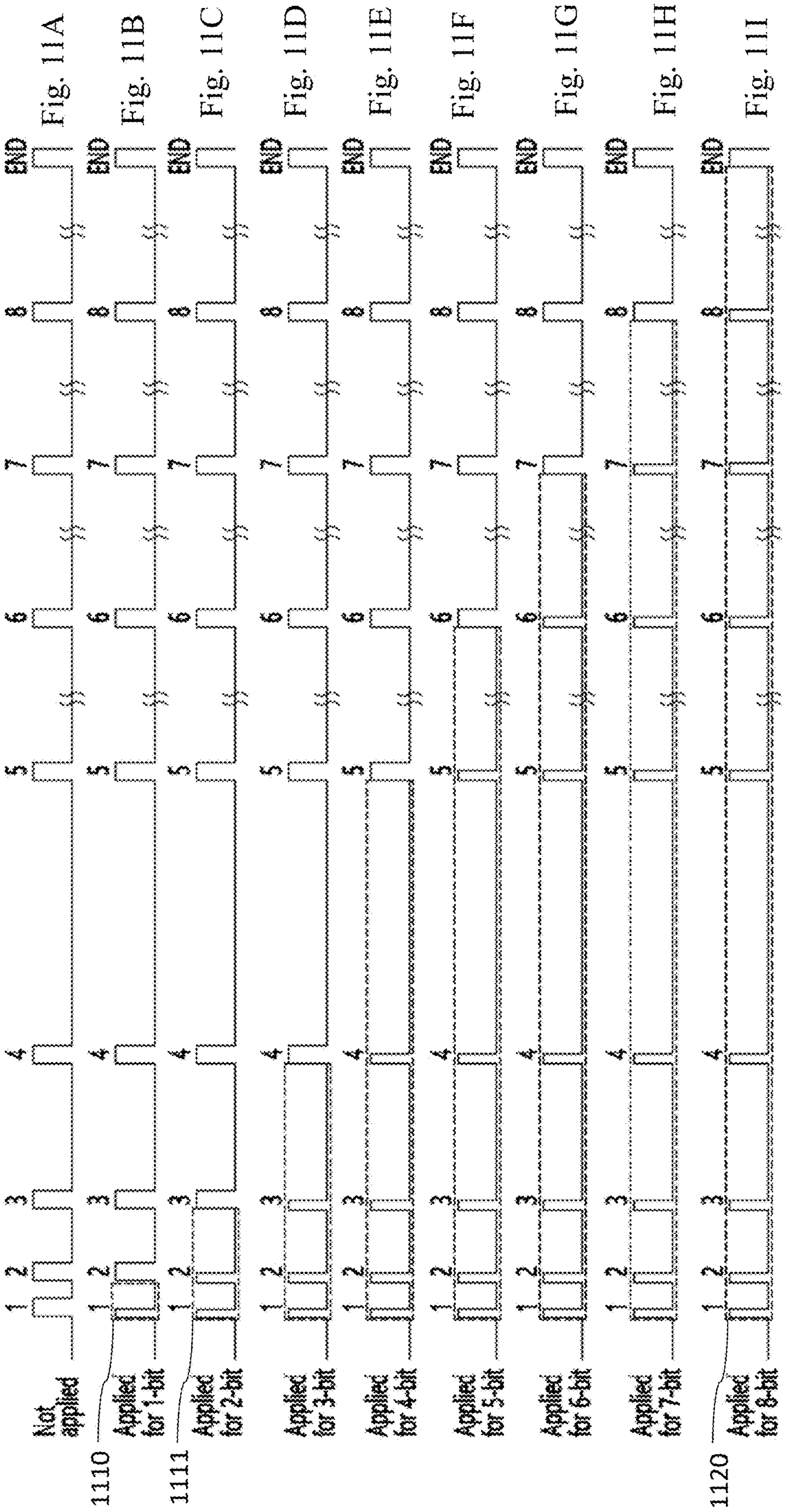
FIGS. 11A to 11I are timing diagrams for describing sections in which a specific operation is omitted depending on a bit configuration, according to embodiments of the present disclosure.

Referring to FIG. 11A, for example, the first operation may be performed for the entire section.

Referring to FIG. 11B, for example, the first operation may not be performed for the section 1110 of the LSB, but the first operation may be performed for the remaining subframes.

Referring to FIG. 11C, for example, the first operation may not be performed for the section 1111 consisting of the LSB and LSB+1, but the first operation may be performed for the remaining subframes.

Referring to FIG. 11I, for example, the first operation may not be performed for the entire section 1120 from the LSB to the MSB.

Meanwhile, referring to FIGS. 11A to 11I, the partial sections in which the first operation is not to be performed may have a narrower pulse width than the section in which the first operation is to be performed. This illustration may mean that, unlike the sections in which the first operation is to be performed, $t_{sample}$ does not need to be maintained in the partial section in which the first operation is not to be performed.

Those of ordinary skill in the art may easily understand that the embodiments described above with reference to FIGS. 9A-9B, 10, to 11A-11I may be implemented in combination with other embodiments.

For example, the controller may control the bias circuit to supply bias power (the second operation) only when the bit value of the image data is 1, and to stop power supply (the first operation) when the capacitor included in the driving unit is charged with the bias power supplied by the bias circuit, in which the state of the bias circuit is always ON in the partial section. In the embodiment according to this example, unlike Equation 3, a power consumed in the section where the first operation and the second operation are performed during 1 cycle may be calculated using Equation 4 below.

$$P_B = \frac{I_{VCC}}{\text{frame\_time}} \times \#cyc \times t_{sample} \times (\#\text{data}) \quad \text{[Equation 4]}$$

In Equation 4, #data may mean the number of bits with a value of 1 in the image data. That is, in the embodiment in which the second operation is performed, bias power is supplied only when the bit value of the image data is 1, such that unlike Equation 3, Equation 4 may include the number of bits with a value of 1 in the image data as a variable. Meanwhile, the maximum value of #data may be n-m. According to the embodiment described above with reference to FIGS. 9 to 11, that is, under a certain driving speed or brightness, when an appropriate section is set not to perform the first operation, static power consumption may be reduced compared to when the first operation is performed in the entire section, thereby enabling efficient driving of the display apparatus.

Figure 12:
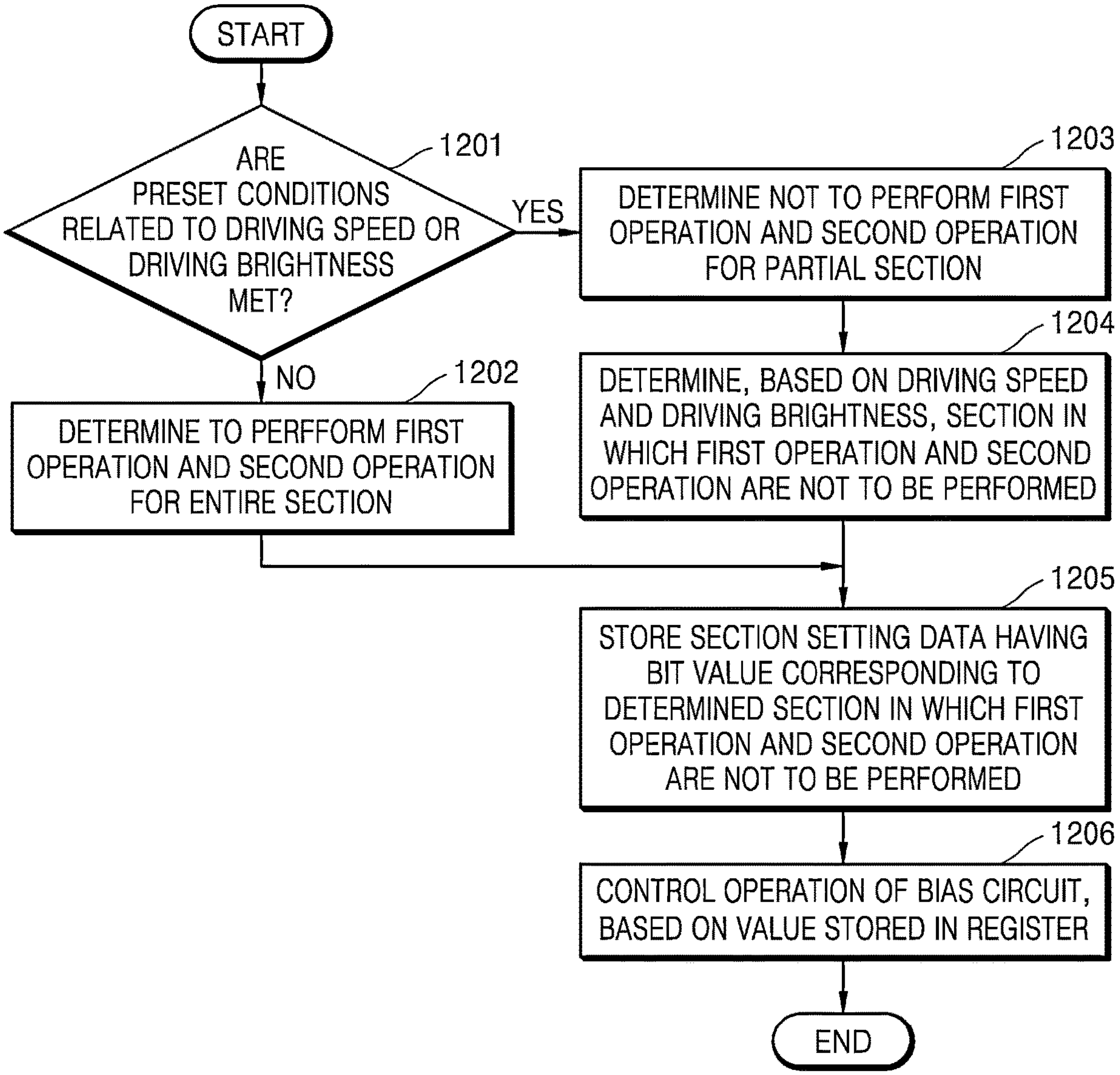
FIG. 12 is a flowchart for describing a control process to omit a specific operation, according to an embodiment of the present disclosure.

FIG. 12 is a flowchart for describing a control process to omit a specific operation, according to an embodiment of the present disclosure.

An example shown in FIG. 12 may relate to an embodiment in which both the first operation and the second operation are performed.

In an embodiment, the controller 140 may determine whether preset conditions related to a driving speed or a driving brightness are met, in operation 1201.

In another embodiment, operation 1201 of determining whether the preset conditions related to the driving speed or driving brightness are met may be performed by any component external to the scan driving circuit 120, the data driving circuit 130, or the pixel driving circuit 200.

In an embodiment, the preset conditions may include any suitable conditions. For example, the preset conditions may include that a driving speed expressed as a frame rate is greater than or equal to a threshold value. For example, the preset conditions may include that a driving brightness expressed as on-duty is greater than or equal to a threshold value. For example, the preset conditions may include that the driving speed is greater than or equal to the threshold value and the driving brightness is less than or equal to the threshold value.

In an embodiment, when it is determined that the preset conditions related to the driving speed or the driving brightness are not met, the controller 140 may determine to perform the first operation and the second operation for the entire section, in operation 1202.

Herein, the entire section may mean the entire section of 1 cycle (i.e., a single frame).

In another embodiment, operation 1202 of determining to perform the first operation and the second operation for the entire section may be performed by any component external to the scan driving circuit 120, the data driving circuit 130, or the pixel driving circuit 200.

In an embodiment, when it is determined that the preset conditions related to the driving speed or the driving brightness are met, the controller 140 may determine not to perform the first operation and the second operation for a partial section, in operation 1203.

In another embodiment, operation 1203 of determining not to perform the first operation and the second operation for the partial section may be performed by any component external to the scan driving circuit 120, the data driving circuit 130, or the pixel driving circuit 200.

In an embodiment, when the controller 140 determines not to perform the first operation and the second operation for the partial section in operation 1203, the controller 140 may determine, based on the driving speed and the driving brightness, a section in which the first operation and the second operation are not to be performed, in operation 1204.

In an embodiment, operation 1204 of determining the section in which the first operation and the second operation are not to be performed may be performed through the above-described process of calculating power consumption.

In another embodiment, operation 1204 of determining the section in which the first operation and the second operation are not to be performed may be performed by any component external to the scan driving circuit 120, the data driving circuit 130, or the pixel driving circuit 200.

In an embodiment, the register may store section setting data having a bit value corresponding to the determined section in which the first operation and the second operation are not to be performed, in operation 1205.

When it is determined that the first operation and the second operation are to be performed for the entire section, there will be no section in which the first operation and the second operation are not to be performed, and in this case as well, the corresponding bit value may be determined as the section setting data and thus stored in the register.

In an embodiment, the section setting data may be generated and input by any component external to the controller 140, the scan driving circuit 120, the data driving circuit 130, or the pixel driving circuit 200.

In an embodiment, the controller 213 (or the bias controller 314) may control the operation of the bias circuit, based on the value stored in the register, in operation 1206.

Figure 13:
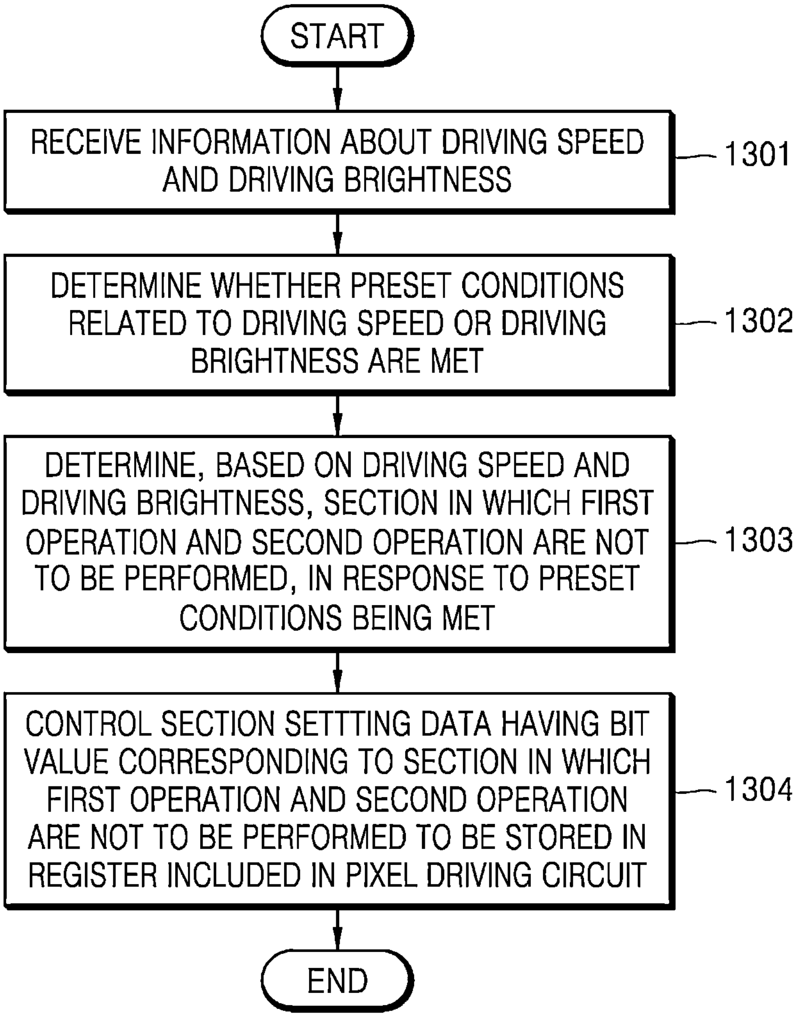
FIG. 13 is a flowchart for describing a method of generating a section setting data, according to an embodiment of the present disclosure.

FIG. 13 is a flowchart for describing a method of generating a period setting data, according to an embodiment of the present disclosure.

Operations shown in FIG. 13 may be performed by any component external to the controller 140, the scan driving circuit 120, the data driving circuit 130, or the pixel driving circuit 200. Hereinafter, for convenience of description, the operations shown in FIG. 13 will be described as being performed by the controller 140.

Various embodiments related to each operation have been described in detail and thus will be omitted.

In operation 1301, the controller 140 may receive information about a driving speed and a driving brightness.

In operation 1302, the controller 140 may determine whether preset conditions related to the driving speed or the driving brightness are met, based on the received information about the driving speed and the driving brightness.

In operation 1303, in response to the preset conditions being met, the controller 140 may determine a section in which the first operation and the second operation are not to be performed, based on the driving speed and the driving brightness.

In operation 1304, the controller 140 may control section setting data having bit values corresponding to the section in which the first operation and the second operation are not to be performed to be stored in a register included in a pixel driving circuit.

The scan driving circuit and the data driving circuit described above may include processors, application-specific integrated circuits (ASICs), other chipsets, logic circuits, registers, communication modems, data processing devices, etc., known in the art to execute the various control logics described above. In addition, when the above-described control logic is implemented with software, the scan driving circuit and the data driving circuit may be implemented as a set of program modules. In this case, the program module may be stored in a memory device and executed by a processor.

A program may include code coded in computer languages such as C/C++, C#, JAVA, python, or machine languages readable by a processor (CPU) of a computer through a device interface of the computer so as for the computer to read the program and execute methods implemented with the program. Such code may include functional code related to functions that define the necessary functions for executing the methods, and may include control code related to an execution procedure necessary for the computer's processor to execute the functions according to a predetermined procedure. In addition, such code may further include memory reference-related code regarding a position (address) in an internal or external memory of the computer at which additional information or media required for the computer's processor to execute the functions is to be referred to. Moreover, when communication with another computer, a server, etc., located remotely is required for execution of the functions by the computer's processor, the code may further include communication-related code regarding how to communicate with the other computer, the server, etc., located remotely using a communication module of the computer, which information or media is to be transmitted in communication, etc.

A storage medium in which a program is stored may not be a medium that stores data for a short period of time, such as a register or cache memory, but may be a medium that stores data semi-permanently and may be read by a device. Specifically, examples of the storage medium may include, but not limited to, read-only memory (ROM), RAM, compact disc (CD)-ROM, magnetic tape, floppy disk, optical data storage devices, etc. That is, the program may be stored in various recording media on various servers that the computer may access or in various recording media on the user's computer. Moreover, the storage medium may be distributed over computer systems connected through a network to store and execute a computer-readable code in a distributed manner.

It would be understood by those of ordinary skill in the art that the present disclosure may be implemented in a modified form within a scope without departing from the essential characteristics of the present disclosure. Thus, the spirit of the present disclosure should not be determined by being limited to the above-described embodiments, and not only the claims set forth below, but also any range equivalent to or equivalently changed from the claims falls within the scope of the spirit of the present disclosure.

By reducing the number of charging times of the capacitor, power consumed to drive the pixel may be reduced.

In addition, by selectively supplying the bias power required for charging the capacitor, the power consumed to drive the pixel may be reduced.

Moreover, in case of driving at a high speed or driving to express a low brightness, the power consumed to drive the pixel may be further reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An array of pixel driving circuits, each pixel driving circuit connected to a light-emitting element, each pixel driving circuit comprising:
- a first pixel-memory configured to store bit values of bit data associated with image data of a time frame comprising a plurality of subframes;
- a processor configured to generate a pulse width modulation (PWM) control signal for controlling light emission or non-light emission of the light-emitting elements, based on the bit values stored in the first pixel-memory;
- a driving circuit switch connected to a power source and configured to supply a power from the power source to the light-emitting element based on the PWM signal;

a bias circuit configured to supply a bias power to charge the capacitor based on a control signal; and a capacitor connected to the bias circuit and configured to, when charged, turn on the driving circuit switch to supply the power to the light-emitting element, wherein the processor is further configured to:

control the bias circuit not to perform an operation of supplying the bias power to the capacitor in a partial section of the time frame.

2. The pixel driving circuit of claim 1, wherein lengths of each of the plurality of subframes corresponding to each binary-bit of the bit values decreases in order from a most significant bit (MSB) to a least significant bit (LSB).

3. The pixel driving circuit of claim 1, wherein the processor is further configured to control the bias circuit to continuously supply the bias power to the capacitor in response to less significant bits than a preset bit.

4. The pixel driving circuit of claim 1, further comprising a register configured to store bit values of bit data associated with the partial section in which the operation is not performed.

5. The pixel driving circuit of claim 1, further comprising a second memory configured to store bit values of bit data associated with a number of charging times of the capacitor within the single frame.

6. The pixel driving circuit of claim 1, wherein the processor is further configured to control the bias circuit to supply the power when the bit value of bit data associated with the image data is 1.

7. The pixel driving circuit of claim 1, wherein the processor is configured to control the bias circuit to perform supplying the bias power to the capacitor, and stopping supplying the bias power when the capacitor is charged with the bias power.

8. The pixel driving circuit of claim 7, wherein the processor is configured to control the bias circuit to continuously supply the bias power to the capacitor in a partial section of the time frame in which the bias circuit remains turned on.

9. The pixel driving circuit of claim 8, wherein the partial section is determined based on at least one of a driving speed and a driving luminance of a pixel.

10. The pixel driving circuit of claim 7, wherein the processor is configured to control the bias circuit not to supply the bias power to the capacitor in a partial section of the time frame in which the bias circuit remains turned on.

11. The pixel driving circuit of claim 10, wherein the partial section is determined based on at least one of a driving speed and a driving luminance of a pixel.

12. A display apparatus comprising:

a display panel comprising an array of a plurality of pixel driving circuits, each of which is connected to a light-emitting element and which form rows and columns;

a scan driving circuit configured to sequentially output row signals to pixel driving circuits arranged in a row direction in the array included in the display panel;

a data driving circuit configured to output column signals associated with driving of light-emitting elements respectively corresponding to the plurality of pixel driving circuits to pixel driving circuits arranged in a column direction in the array included in the display panel; and a timing controller configured to generate signals for controlling operations of the scan driving circuit and the data driving circuit, wherein each of the plurality of pixel driving circuits comprises:

a first pixel-memory configured to store a bit value of bit data associated with image data of a time frame comprising a plurality of subframes;

a processor configured to generate a pulse width modulation (PWM) control signal controlling light emission or non-light emission of a corresponding light-emitting element, based on data stored in the pixel-memory;

a driving unit switch connected to a power source and configured to supply a power from the power source to the corresponding light-emitting element based on the PWM signal and the control signal, received from the processor;

a capacitor connected to the driving circuit switch and configured to, when charged, turn on the driving circuit switch to supply the power to the light-emitting element; and a bias circuit configured to supply a bias power to charge the capacitor based on a control signal, wherein the processor is further configured to:

control the bias circuit not to perform an operation of supplying the bias power to the capacitor in a partial section of the time frame, and the timing controller is further configured to generate a bit value of bit data associated with the partial section in which the operation of supplying the bias power is not performed.

* * * * *